United States Patent [19]

Dragoset, Jr. et al.

[11] Patent Number: 4,658,384

[45] Date of Patent: Apr. 14, 1987

[54] METHOD FOR DETERMINING THE FAR-FIELD SIGNATURE OF AN AIR GUN ARRAY

[75] Inventors: William H. Dragoset, Jr.; Dennis L. Cumro, both of Houston, Tex.

[73] Assignee: Western Geophysical Co. of America, Houston, Tex.

[21] Appl. No.: 689,432

[22] Filed: Jan. 7, 1985

[51] Int. Cl.$^4$ .......................... G01V 1/38; G01V 1/16
[52] U.S. Cl. ...................... 367/23; 367/144; 181/110; 181/118
[58] Field of Search .................. 367/20, 21, 22, 23, 367/56, 57, 144, 153; 181/110, 111, 118

[56] References Cited

U.S. PATENT DOCUMENTS 3,866,161 2/1975 Barr, Jr. et al. .................. 367/24
4,476,550 10/1984 Ziolkowski et al. ............. 367/144
4,476,553 10/1984 Ziolkowski et al. ............. 367/21

Primary Examiner—Nelson Moskowitz
Assistant Examiner—Ian J. Lobo
Attorney, Agent, or Firm—William A. Knox; E. Eugene Thigpen

[57] ABSTRACT

The far-field pressure signature of an air-gun array is derived from near-field measurements. An array of air guns is deployed in the water at a desired depth. A hydrophone is suspended in the middle of the array at the same depth so that the guns are equidistant from the hydrophone. The lateral spacing between the guns and the sensor is much less than the water depth of the guns. Having fired the guns, the ghost reflection amplitude in the near field will be much less than the amplitude of the direct arrivals and can be ignored. The far-field signature is determined by inverting the observed pressure signature, delaying it in proportion to array depth and adding the inverted, delayed signature back to the original signature.

17 Claims, 8 Drawing Figures

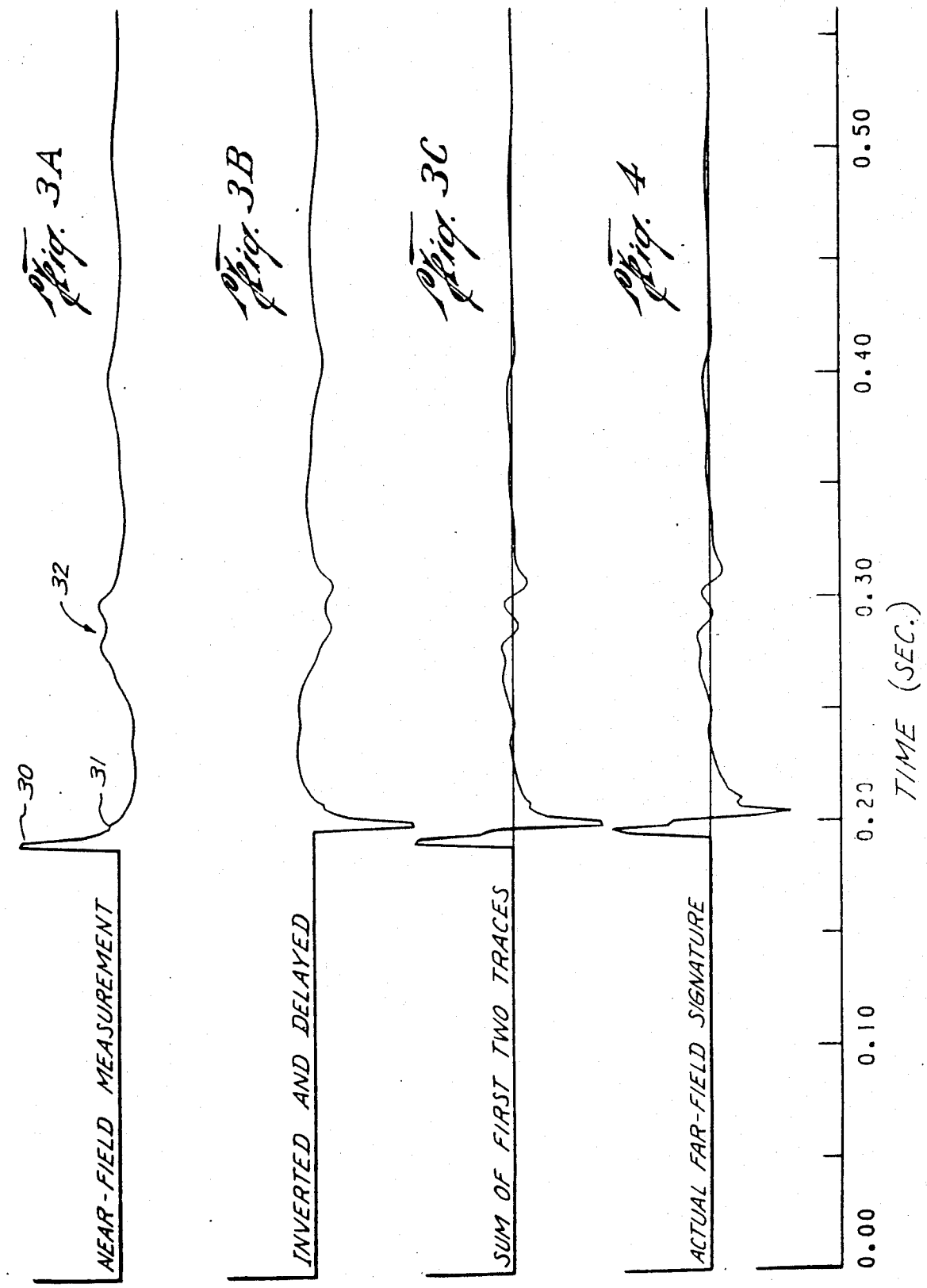

METHOD FOR DETERMINING THE FAR-FIELD SIGNATURE OF AN AIR GUN ARRAY

BACKGROUND OF THE INVENTION

1. Field of the Invention

This invention is concerned with deriving the far-field signature of a marine seismic acoustic source, such as a multi-element air-gun array, from near-field measurements.

2. Description of the Prior Art

As is well known, in the process of marine seismic exploration, a ship-towed submerged acoustic source is periodically triggered to generate an acoustic wave field. The resulting wavefront propagates downwardly into the earth beneath the water, is reflected from sub-bottom earth layers, and returns to the water surface. Near, but below the water surface, arrays of hydrophones, towed by the same or another ship, detect the reflected pressure waves, convert the detected pressure waves to electrical signals and transmit those signals to a signal utilization device.

As is well known, when the acoustic source is triggered, it produces a complex output pressure pulse in the water. Converted to an electrical signal, the output pulse of, for example an air gun, consists of a short wavetrain whose envelope displays an initial fast rise time followed by several rapidly-decaying oscillations. The wavetrain might be, for example, about 200 milliseconds (ms) or less long and is termed the "signature" of the source.

The acoustic wave generated by the source radiates by spherical spreading in all directions such that there is a vertically downgoing direct component as well as an upwardly-travelling component. The water-air interface is an excellent reflecting surface. The upward-travelling component of the acoustic wave is reflected by the water surface and is reversed in polarity to become another vertically downgoing component generally referred to as a ghost.

Marine acoustic sources are usually deployed a few meters beneath the water surface. Assuming a depth of 6 meters and a water velocity of 1500 meters per second (mps), the two-way lag time in the vertical direction between the direct wave and the ghost is 8 ms. Accordingly, the ghost may interfere, with opposite polarity, with the direct wave to further complicate the source signature which circumstance we shall refer to as the ghost effect. Whether we like it or not, the ghost is usually an integral part of the source signature for most all practical purposes.

If the acoustic souce can be considered to be a point source, such as a small explosive charge or a single air gun, the source signature without its ghost is independent of distance (except for spherical spreading) and direction. In practice, a typical acoustic source consists, not of a single element, but of a spatially-distributed array of elements that generate direct arrivals plus the ghost components. That is particularly true of air guns, which are currently fashionable in marine exploration. The spatial dimensions of an array of source elements may be comparable to the wavelengths of the acoustic waves themselves within the useful seismic-frequency pass-band. Therefore, as is well known, the source signature of an array in the near field becomes a function of both distance and direction. The source signature of an array becomes independent of distance (except for attenuation due to spherical spreading) only in the far field. It is the far-field signature that is needed for data processing.

The far field may be firstly defined as the region at a distance from the source array such that the travel time from all the sources of the array is effectively equal. For practical purposes, equality means differences of at most a few (2-5) milliseconds. By this criterion, the far-field distance, for a typical array dimension of 30 or 40 meters, is on the order of 200 meters.

A further criterion defining the far field is related to the ghost component of the source signature. Because of spherical spreading, the relative amplitude of the direct and ghost components vary with distance from the source array. Again, the far-field signature is that distance at which the source signature becomes independent of distance, which for this criterion is that distance at which the ratio of the direct and ghost amplitudes becomes close to that which it would be at very large distances. In practice a 95% development of the ghost component with respect to the direct component would be acceptable. For an array depth of 6 meters, that criterion would give a far-field distance of about 250 meters.

In summary, therefore, close to the source, the level of the direct arrival as seen in the pressure signature will be very much larger than the amplitude level of the ghost. The two amplitude levels become equalized only in the far field.

The main objective of the above discussion is to emphasize that typically, the far-field distance for a marine source array is on the order of 200 to 300 meters. A direct measurement of the far field must therefore be made at that, or a greater, distance directly or nearly directly below the array.

We now address ourselves to the problem of measuring the far-field signature of a multi-element acoustic source array such as an array of air guns.

Most marine seismic exploration projects are conducted over the continental shelf at water depths in the range of less than 25 up to about 200 meters. Thus, a direct measurement of the far-field signature is generally impossible during the course of a normal exploration project. Even if the water depth were greater than 200 meters it would not be practical to tow special receivers at such great depth.

One obvious, time-honored method for measuring the far-field signature of an acoustic array is of course to move into deep water in excess of 200-300 meters. However there are certain problems: Often, deep water may lie a great many miles from the exploration project. The cost of interrupting the seismic survey to make special separate experiments is usually unjustifiable. For another reason, at sea it is nearly impossible to determine the precise relative positions of a source and a receiver that are significantly separated from one another without extremely expensive and elaborate positioning equipment. Hence, far-field measurement of the source array signature in deep water may not be possible nor even useful.

A method for far-field signature measurement from near-field data in shallow water has been proposed by Ziolkowski, et al. in U.S. Pat. Nos. 4,476,550 and 4,476,553 issued Oct. 9, 1984. In that method, the acoustic pressure signature near each gun of an air-gun array is measured in the presence of the pressure signatures of all of the guns. By suitable processing, the far-field signature is derived from the near-field measurements.

In the above method, with an array of n guns, the problem is solved iteratively from n separate measurements. In their method, like the deep-water method, Ziolkowski, et al. require precise measurements of the separation between source and receivers as well as a precise measurement of the spacing between elements of the array. As before stated, it is very difficult to accurately measure the position of anything that is towed freely around in the sea.

It is an object of our invention to determine in a simple way, the far-field signature of a marine acoustic source array, during the course of a normal data-acquisition program, in relatively shallow water (e.g. 50 meters or less).

SUMMARY OF THE INVENTION

In accordance with an aspect of this invention, a substantially circular symmetrical array of air guns is established. The air guns are all immersed in a body of water at a preselected depth. A pressure sensor is suspended in the water at the same depth as the air guns. The radius of the circular array may be comparable to or less than the gun depth. The guns simultaneously are fired and the composite arrival signature is recorded. The signature is deghosted, inverted, delayed in proportion to gun depth and reghosted. Reghosting is done by adding the inverted, delayed signature back to the deghosted signature. The reghosted signature may be scaled to the far field.

In an alternate approximate procedure for use in real-time data processing, the composite signature is simply multiplied by $-1$, or a number near $-1$ that approximates the reflection coefficient of the water-air interface, delayed in proportion to gun depth, and added back to the original signature.

In accordance with another aspect of this invention, the pressure sensor is caused to remain stationary within the air-gun wave field of the array for a preselected dwell time while the towing ship proceeds along its course.

In accordance with a further aspect of this invention any air-gun array configuration may be used provided the air guns are substantially equidistant from the pressure sensor.

BRIEF DESCRIPTION OF THE DRAWINGS

A better understanding of the benefits and advantages of our invention may be obtained from the appended detailed description and the drawings, wherein:

FIG. 3A is the original observed near-field air-gun signature plotted in terms of pressure P, and time in seconds;

FIG. 3B is an inverted, delayed representation of the signature of FIG. 3A;

FIG. 3C is the sum of traces 3A and 3B;

FIG. 4 is an observed far-field signature, scaled to account for spherical spreading for comparison with FIG. 3C.

DETAILED DESCRIPTION OF THE PREFERRED EMBODIMENT

Figure 1B:
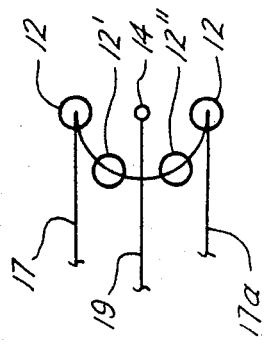
FIG. 1B is an alternate configuration for the air guns.
Figure 1A:
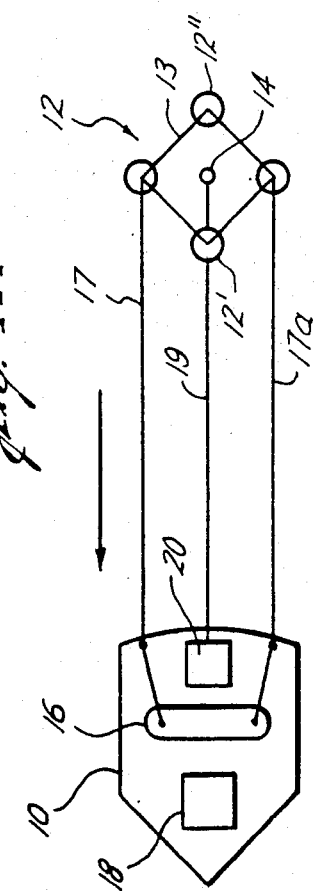
FIG. 1A is illustrative of a plan view of a ship towing an array of air guns and a pressure sensor.

We show, in FIG. 1, a ship 10 towing a substantially circular, preferably symmetrical array 12 of air guns through a body of water. It is to be understood that an array in which all elements are substantially equally distant from a central point, e.g. an array of four elements at the corners of an elongate rectangle, may be used. Such an array in this context will be termed "centrally symmetric". For example, see FIG. 1B wherein the array is semicircular. A pressure sensor 14, such as a hydrophone, is suspended substantially in the center of the array 12 and at the same depth in the water as the air guns themselves. Four guns are shown but more or fewer could be used. Other much larger hydrophone arrays and air-gun arrays as used for routine seismic exploration may also be towed by ship 10 but are not shown as they are not germane to this invention. The respective guns of array 12 are coupled to suitable air compressors 16 by conventional means such as high-pressure hoses. A control and signal-recording means 18, provides triggering signals to the guns, receives and stores, if desired, the electrical signals from the sensor 14, that represent the air-gun-array pressuresignature. Air-gun array 12 is supported by a framework 13 that is floated on the surface of the water by buoys 15 (FIG. 2) or the like. The array is towed by cables 17 and 17a secured to ship 10. Sensor 14 is independently towed by a line 19.

Figure 2A:
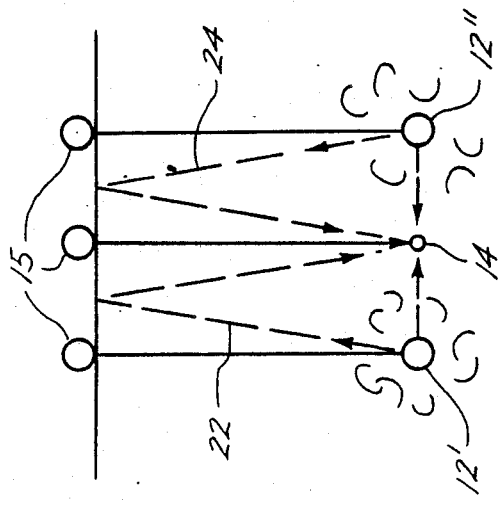
FIG. 2A is a side view of an array of air guns and a pressure sensor suspended in a body of water.

FIG. 2A is a side view of the air-gun array 12 and sensor 14. All of the devices are preferably suspended at the same depth from suitable buoys 15. A preferred depth might be about 6 meters. The spacings between the guns and the sensor must be equal and may conveniently be about 2 meters. The sensor 14 is thus seen to lie equidistant from the guns of the array. When the guns in array 12 are fired, the point of reference for measuring the near-field pressure signature is at the center of the wave field.

Figure 2B:
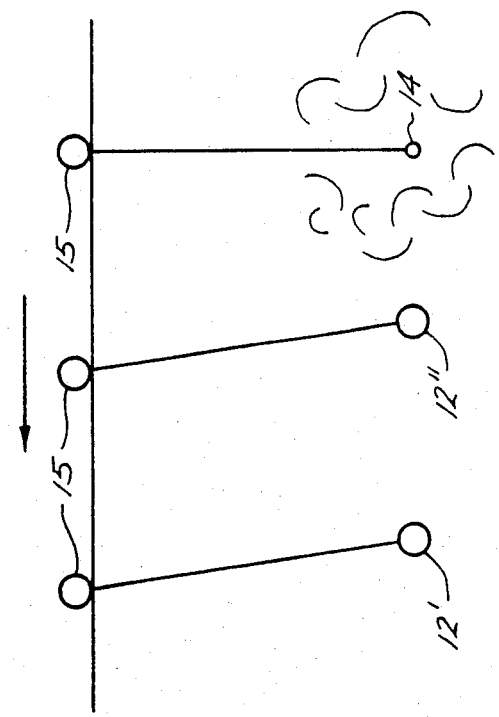
FIG. 2B is a side view showing movement of the air-gun array while the sensor remains in a static position in the wave field.

At desired intervals, the air guns are triggered to generate acoustic waves which the pressure sensor receives. However, the ship is constantly moving and along with it, are towed the air-gun array 12 and the sensor 14. Therefore, during the 100 to 200 millisecond time window during which the pressure signature develops, the sensor is being moved out of the wave field generated by the air guns. Such movement necessarily would create error in the true pressure signature measurements. To avoid such an effect, the sensor 14 is manipulated by a yo-yo device 20 such that after a shot, the sensor tow line 19 is reeled out backwards at the same speed that the ship sails forward. The sensor is thereby allowed to remain in a static position relative to the air-gun wave field for a preselected dwell period of perhaps one quarter to one half a second. The sensor then is reeled back into position. One such yo-yo device is disclosed in U.S. Pat. No. 4,314,363, assigned to the assignee of this invention. FIG. 2B is a side view of the air-gun array and the sensor after the guns have fired, with sensor 14 remaining in the wave field while the guns are being moved along in the direction of the arrow.

In FIG. 2A, the dashed lines between gun 12', sensor 14 and gun 12" indicate the direct acoustic travel path. The other guns are out of the plane of the Figure and are not shown. The ghost arrival must propagate over a travel path from guns 12' and 12" to water surface 24 and thence to sensor 14 as shown by the dashed lines 22 and 24. The total slant-path-length for the ghost is 12+ meters or more than six times the length of the direct travel path. Therefore, the amplitude level of the ghost arrival will be less than one-sixth the amplitude level of the direct arrival. For example, refer to FIG. 3A where the ghost 31 is barely visible.

In the near field, the ghost arrival 31 is small with respect to the direct arrival 30 (FIG. 3A). The near field is defined as that gun-to-sensor distance at which the direct-to-ghost amplitude ratio is on the order of 18 dB or more. A first approximation to the far-field signature can be synthesized quite simply by inverting the observed pressure signature (i.e. multiplying by $-1$, or a number near $-1$ that approximates the reflection coefficient of the water-air interface, to reverse its polarity), delaying it in time in proportion to the array depth, and adding it back to the original observed signature. In the case of FIG. 2A, the time delay for the ghost arrivals from the guns 12' and 12" to sensor 14 is about 8 ms, assuming a water velocity of 1500 feet per second over a 12-meter total path-length difference.

FIG. 3A is the measured raw pressure signature plotted as a function of amplitude vs time in seconds. The direct primary arrival is indicated at 30. The near-field ghost is the low-amplitude glitch 31. Transient 32 is the first bubble pulse which does not concern us in this specification. Trace 3B is the inverted raw pressure signature, time-shifted about 8 ms. Trace 3C is the sum of the 3A and 3B traces and is the synthetic far-field pressure signature. Because of attenuation due to spherical spreading, trace 3C should be scaled to the far field.

FIG. 4 is an actual far-field signature, presented for comparison with the composite pressure signature of FIG. 3C.

The approximate method is useful for applications where shipboard data processing must be done in near real time. Such data processors of any well known type may be incorporated into signal recording means 18.

In a more refined and rigorous, although somewhat lengthier process, the near-field pressure signature is first deghosted by any one of a number of well-known algorithms. The deghosted signature is scaled to the far field, delayed and then reghosted as above. This refinement of course, removes any signature distortion that might be introduced in the approximate method because of the presence of the residual ghost, which although quite small, does indeed exist. The more refined, but more time-consuming process is suitable for use in a post-survey data processing center.

It is preferable in practicing the above method, that air-gun array 12 and sensor 14 be sufficiently far removed from other arrays so that the respective wave fields do not interact. Or at least, the wave fields should not interact during the time frame encompassed by the pressure-signature envelope.

For illustrative purposes, our invention has been described wtih a certain degree of specificity. Variations will occur to those skilled in the art but which may be included within the scope and spirit of this invention which is limited only by the appended claims.

We claim:

1. A method for deriving the far-field signature of an air-gun array in real time, comprising:
   towing an air-gun array at a preselected depth in a body of water, the air guns of said array being positioned substantially on the circumference of a circle;
   positioning a pressure sensor in the water substantially at the center of said circle;
   firing said air-gun array to generate a wave field;
   sensing the near-field pressure signature of said air-gun array by said pressure sensor; and
   multiplying said pressure signature by a negative number substantially equal to the reflection coefficient of the water-air interface, delaying in time the so-multiplied pressure signature by the time required for the pressure wave to travel from said array to the water surface and back to the array, and adding the delayed signature to said near field signature.

2. The method according to claim 1 comprising the further step of:
   deghosting said near-field pressure signature prior to the step of multiplying.

3. The method according to claim 1 comprising the further step of:
   causing said sensor to remain in a static position relative to said wave field for a preselected dwell period following said step of firing.

4. A method for determining the far-field signature of an air-gun array from measurements made in the near field comprising:
   deploying an air-gun array at a predetermined depth in a body of water, the air guns of said array being positioned substantially on the circumference of a circle;
   positioning a hydrophone in the water substantially at the center of the circle at the same depth as the air-gun array;
   generating a pressure wave field with said air-gun array;
   sensing, with said hydrophone, the near-field pressure signature of said wave field as a function of time;
   inverting the sensed pressure signature, delaying the inverted pressure signature by twice the time required for the pressure wave to travel from the array to the water surface and adding said inverted, delayed pressure signature to said sensed pressure signature to create a composite pressure signature; and
   scaling said composite pressure signature to the far field.

5. The method according to claim 3, wherein the lateral spacing between the air guns of the air-gun array and the pressure sensor is less than the preselected depth.

6. The method according to claim 4, wherein the lateral spacing between the air guns of the air-gun array and the hydrophone is less than the preselected depth.

7. A method for deriving the far-field pressure signature of an air-gun array positioned in a body of water from near-field measurements, comprising;
   measuring the raw pressure signature at a point substantially at the center of a circle of a wave field originating from a plurality of air guns positioned along the circumference of said circle;
   time-shifting the measured pressure signature by a preselected time delay equal to the time required for the wave field to travel from said array to the surface and back to the array;
   reversing the polarity of said time-shifted pressure signature; and
   combining said measured raw pressure signature with said time-shifted reversed pressure signature.

8. The method as defined by claim 7, and scaling said combined pressure signature to the far field.

9. The method as defined by claim 8, wherein the point of reference in the step of measuring lies at the center of said symmetrical wave field.

10. A method for deriving the far-field signature of a seismic source array from a near-field measurement, comprising:
- positioning the sources of said source array substantially on the circumference of a circle at a selected depth in a body of water;
- positioning a pressure sensor substantially at the center of said circle;
- firing said seismic source array to generate a wave field;
- sensing the pressure signature of said wave field with said sensor; and
- generating a signal by multiplying the sensed pressure signature by the negative reflection coefficient of the water interface, delaying said multiplied signal by the length of time required for the pressure wave to travel from said array to the water surface and back to the array and adding said multiplied and delayed signal to the sensed pressure signature.

11. The method of claim 10 further comprising towing said array in a body of water during the time said sources are fired and the pressure is sensed.

12. The method of claim 10 further comprising removing the ghost signal from the pressure signature prior to multiplying said pressure signature.

13. A method for deriving the far-field signature of a seismic source array from a near-field measurement comprising;
- deploying a seismic source array at a selected depth in a body of water, said array being configured so that all sources of said array are at substantially an equal distance from a selected point;
- positioning a pressure sensor substantially at said selected point;
- activating said seismic source array to generate a pressure wave field;
- detecting the pressure signature of said pressure wave field with said pressure sensor; and
- summing with said detected pressure signature a signal substantially equal in magnitude but opposite in phase to said detected pressure signature and time delayed with respect to said detected pressure signature by substantially the travel time of said pressure wave field from said array to the water surface and back to the array to generate said far-field signature.

14. A method for determining the far-field signature of a seismic source array from a near-field measurement, comprising:
- deploying a seismic source array at a selected depth in a body of water, said array being configured so that all sources of said array are at substantially an equal distance from a selected point;
- positioning a pressure sensor substantially at said selected point;
- activating said seismic source array to generate a pressure wave field;
- sensing the pressure signature of said wave field with said pressure sensor;
- removing the ghost component of said pressure signature to generate a deghosted signature;
- generating a signal substantially equal in magnitude and opposite in phase to said deghosted signature and delayed in time with respect to said deghosted signature by substantially the travel time of said pressure wave field from the seismic source array to the water surface and back to the sensor; and
- combining said deghosted signature with said delayed signal to create a composite pressure signature.

15. The method of claim 14 further comprising scaling said composite pressure signature to the far field.

16. Apparatus for determining the far-field signature of a seismic source array from a measurement made in the near-field, comprising:
- a seismic source array in which the sources included in said array are positioned substantially along the circumference of a circle; and
- a seismic sensor positioned at a location substantially equally distant from all said sources.

17. The apparatus of claim 16 wherein said array is deployed substantially at a predetermined depth in a body of water.

* * * * *